United States Patent Office 3,335,287
Patented Aug. 8, 1967

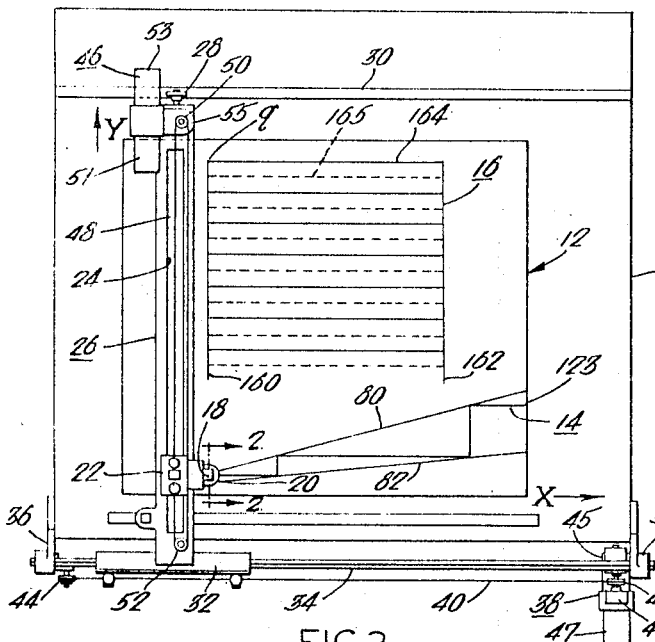
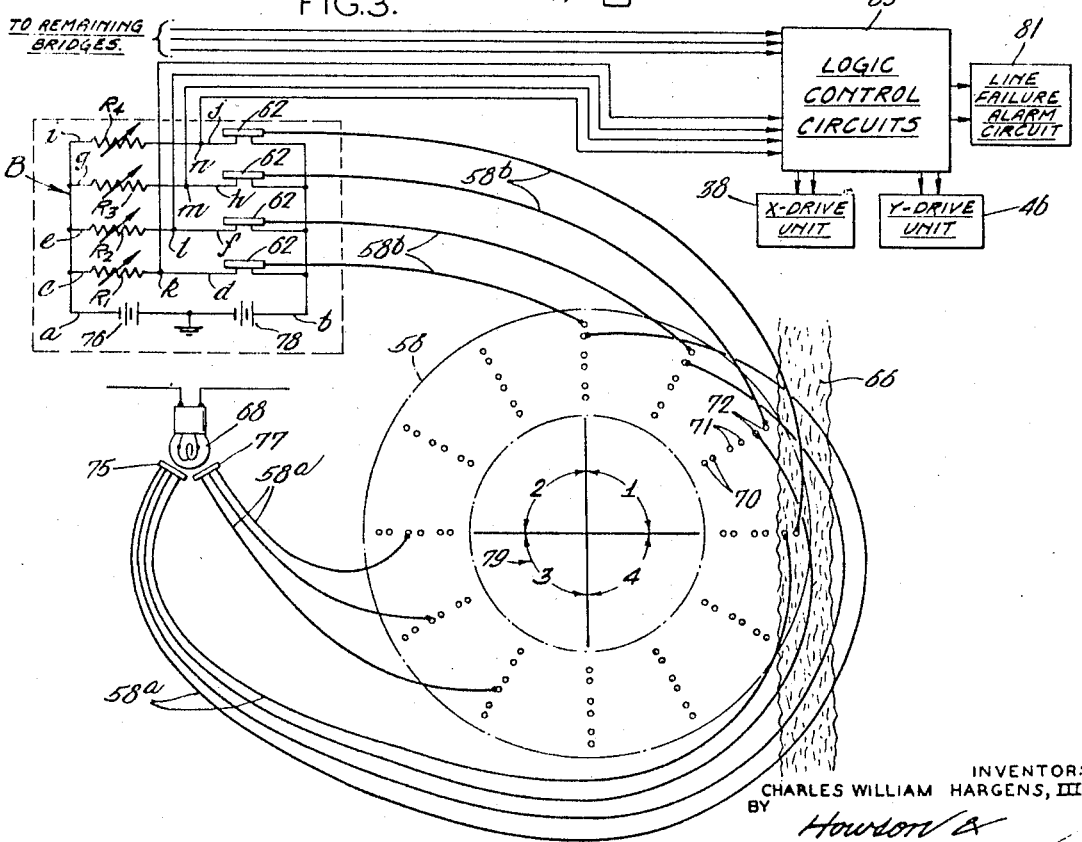

3,335,287
PHOTOSENSITIVE SELF-MONITORING DRAWING PLOTTER USING LIGHT CONDUCTING FIBERS
Charles W. Hargens III, Philadelphia, Pa., assignor to The Franklin Institute, Philadelphia, Pa., a corporation of Pennsylvania
Filed July 17, 1964, Ser. No. 383,474
38 Claims. (Cl. 250—227)

ABSTRACT OF THE DISCLOSURE

A drawing plotter including a frame defining a support surface for inscribable means from which light can be reflected, the inscribable means having programming guide lines drawn thereon. A plotter head apparatus is provided having a scriber and a scanning head, which includes optical fibers with their ends in an array arranged to pick up light reflected from the inscribable means, at least some of the optical fibers having associated photosensitive devices. Drive means is provided for producing movement of the plotter head apparatus to draw lines and pick up light. Circuit means is connected to the photosensitive devices of the fibers for providing outputs indicative of the response of the photosensitive devices to light picked up by the associated fibers and indicating when the guide line and line drawn are in the light pick up position of different of the fibers. Control circuit means is employed to connect the outputs of the circuit means to the drive means to cause the drive means to move the plotter head apparatus in a predetermined manner in accordance with the guide lines and to cause the drive means to stop when the line drawn by the scriber ceases to be sensed by various of the optical fibers.

---

The present invention relates to a self monitoring drawing plotter and more specifically to a mechanical drawing instrument. More specifically, the invention relates to a combination of the mechanism, performing self monitoring and self-programming functions through the use of optical fibers.

In my co-pending application entitled, "Optical Fiber Transducer," Ser. No. 404,218, filed Oct. 18, 1964, I describe optical fiber arrays and photocells or sensors used in a coordinate motorized transducer for following or creating a curve in a rectilinear coordinate system. This copending application discloses one arrangement of the invention wherein coordinate points of a curve are being converted into a code record, and another arrangement wherein the transducer is controlled by a code record to produce a curve, operate a machine or the like. Such a linear array of fibers as disclosed in that application is made useful through the addition of fiber and object illuminators and photoelectric cells or sensors. With such a combination it is possible to transmit and receive light signals selectively along single fibers. The assembly thus functions both as a recorder and a reproducer. The optical fiber transducer described in that co-pending application has some parts somewhat similar to some of those preferably employed in the present invention.

The present invention employs a plotter head apparatus which not only draws desired lines but monitors the line drawn as the plotter progresses, thus being capable of use in checking, correcting, systematically altering and creating patterns. The plotter head apparatus includes a scriber and an array of optical fibers located around the scriber forming a scanning head. On some of the optical fibers there are formed integral photosensitive devices for converting light energy picked up and transmitted through the optical fibers into electrical energy in the photosensitive device, in a manner similar to that of my co-pending application. Some of the photosensitive devices can be connected in bridge circuits, for example, as a means for detecting and transmitting the error signal upon the condition that the line being drawn ceases to be detected. The error signal is supplied to control circuit means which can sound an alarm or turn off the plotter drive means.

Another of the novel features of the drawing plotter herein disclosed is the substitution of the sensing capability of the optical fibers for some of the programming routines performed by a human operator. For example, the plotter head apparatus of the present invention can be programmed to proceed along a previously drawn line until it reached the end of the line, at which time a new direction can be commenced automatically. Through the use of optical fibers and a source of light serving as a means for illuminating an inscribable means providing a surface on which lines can be drawn and light reflected, it is possible to have the light from the source reflected by the surface and picked up by some of the optical fibers. When the reflected light from the surface picked up by the fibers changes, as when an existing line on the sheet is encountered, the amount of electrical energy produced by the photosensitive devices of the associated fibers changes. The signals produced by the photosensitive devices indicating the presence of a guide line are supplied to circuit means and control circuit means which supply the power to the drive means for moving the plotter head apparatus. The control circuit means will send a signal to the drive means to operate them in a manner to cause the plotter head apparatus to initiate some predetermined action to avoid crossing the guide line on the sheet. In this manner, some of the self-programming functions of the plotter are performed by using guide lines which are sensed by the optical fibers.

For a better understanding of the present invention, reference is made to the following drawings wherein:

FIG. 1 is a plan view of a coordinate system showing self-programmed patterns drawn by the plotter of the present invention and showing the preferred embodiment of the invention;

FIG. 2 is an enlarged side elevational view, partially in section, of the plotter head apparatus embodied in the invention, the view being taken along the line 2—2 of FIG. 1;

FIG. 3 is a schematic diagram showing representative fibers in the scanning head with photoelectric cells connected in electric bridge circuits for operating the logic control circuit and related equipment;

Figure 4:
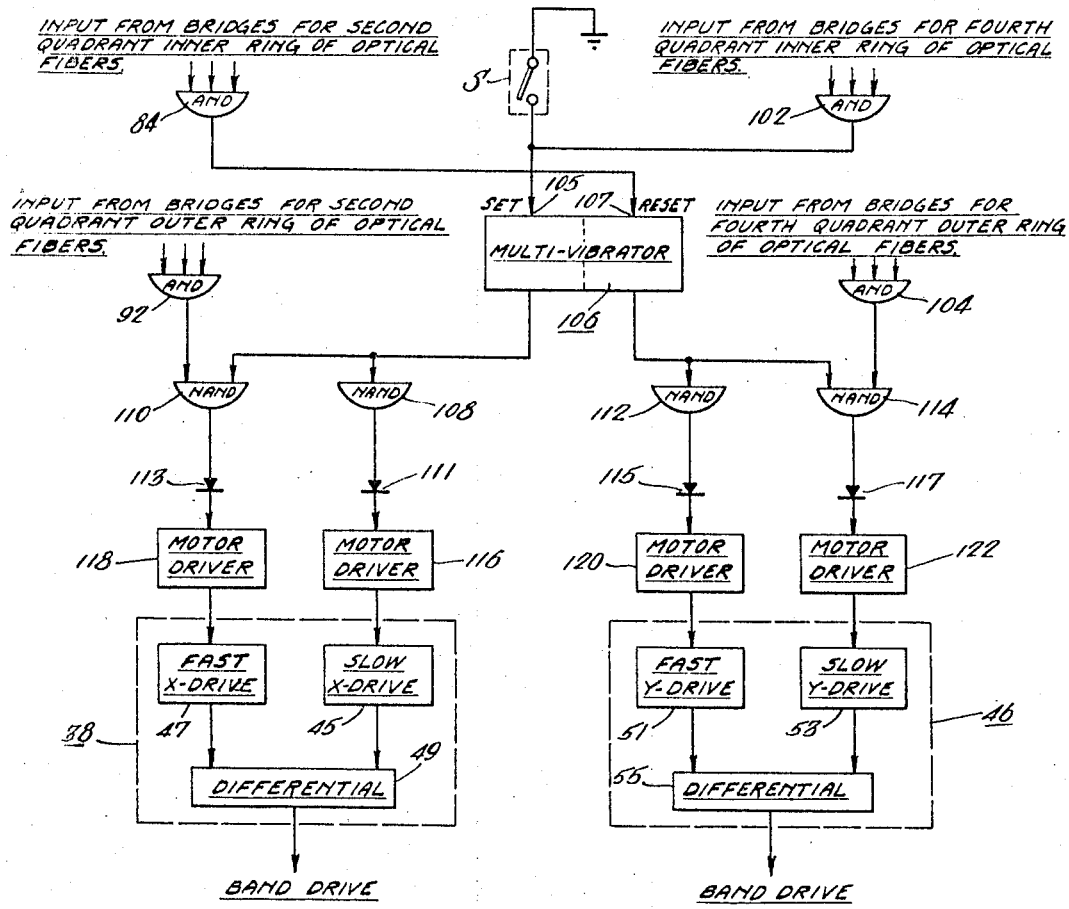
FIG. 4 is a block diagram of one logic control circuit for producing one of the patterns shown in FIG. 1.

Referring to FIG. 1, the plotter there illustrated includes a support base board 10 having an x–y coordinate system. A sheet 12 on which patterns are drawn is shown with representative patterns 14 and 16 having been made on the sheet by the scriber in plotter head apparatus 18.

The plotter head apparatus 18, which is somewhat similar to the one disclosed in my application entitled, "Optical Fiber Transducer," is supported by a bracket 20 secured on a slide carriage 22 movable along retaining guide tracks 24 of a traveling bridge bar 26. The slide carriage 22 has movement in a direction which may be considered the y-axis and the bridge bar 26 travels in a direction which may be considered the x-axis, the x-axis and y-axis being mutually perpendicular. One end of the bridge bar 26 is supported by a roller 28 riding on a support rail 30 on the base board, and the other end of the bridge bar is rigidly secured to a support carriage 32 mounted for movement along a guide rail 34, which is supported by brackets 36 secured to the base board.

The x-axis movement of support carriage 32 and bridge bar 26 are produced by drive unit 38 turning drive band 40 which is secured at its ends to the support carriage and passes over a differential drive shaft sheave 42 and an idler sheave 44. The drive unit 38 consists of a slow x motor 45 and a fast x motor 47 coupled through a differential 49, so that the sum of the movements of the motors 45 and 47 is applied to the differential drive shaft sheave 42.

The y-axis movement of the slide carriage 22 is produced by y drive unit 46 turning drive band 48, which is secured at its ends to the slide carriage and passes over a differential drive shaft sheave 50 and an idler sheave 52. The y drive unit 46 consists of a slow y motor 51 and a fast y motor 53 coupled through a differential 55, so that the sum of the movements of the motors 51 and 53 is applied to the differential drive shaft sheave 50.

FIG. 2 is a side elevational view, partially in section, of the plotter head apparatus embodied in the present invention. The plotter head apparatus is shown comprising a scriber 54 and scanning head 56 formed as a right circular hollow cylinder around the scriber 54. The scanning head 56 includes an array of optical fibers generally designated 58 annularly arranged around the scanning head. The endings of the optical fibers 58 annularly arranged around the lower end of the scanning head are positioned in pairs, as shown by the schematic diagram of the lower end of the scanning head in FIG. 3. The positioning of the pairs is such that when light is transmitted through one of the optical fibers 58a of the pairs and intercepted by sheet 12, some of the reflected light from the sheet will be picked up and transmitted along the other optical fiber 58b of the pair. The use of this arrangement will be explained later.

Referring back to FIG. 2, the scriber 54 and the scanning head 56 are free to move reciprocably upward and downward independently of each other and with respect to the tubular housing element 60. The freedom of movement of the scanning head 56 and scriber 54 is desirable to avoid critical clearance adjustments and permit a choice of forces thrusting the scriber against the sheet 12 on base board 10.

The bearing surfaces between the scriber 54 and the scanning head 56, and between the scanning head and the tubular element 60 are preferably gas lubricated. The gas, such as dry air, is supplied to the plenum 57 through flexible hose 59 connected to a suitable gas supply at the desired pressure. The gas also serves resiliently to urge the scriber and scanning head downward toward sheet 12. The scanning head 56 in FIG. 2 is shown raised, but normally the scanning head rides in contact with sheet 12.

The plotter head apparatus also houses the scriber solenoid 61. The scriber solenoid 61 comprises a rod 63, at one end attached to the scriber 54 and at its other end to a magnetic core 65, which is in the magnetic field of the solenoid winding 67 on spool 69. The scriber solenoid is used to elevate the scriber 54 as, for example, when the plotter is programmed to skip spaces in drawing dashed lines.

One optical fiber 58b of each optical fiber pair has its end terminated in a photoelectric cell 62, similar to those disclosed in my co-pending application entitled, "Filamentary Photocell Device," Ser. No. 271,949, filed Apr. 10, 1963. The ends of those optical fibers associated with the photoelectric cells in the scanning head are used to pick up light signals reflected from the sheet 12 and transmit the light signals to the photoelectric cells where the light signals are converted into electrical signals to operate the plotter in a predetermined manner. The photoelectric cells are housed by the cap 64 which is supported on bracket 20. The bracket also serves to hold and guide the tubular element 60 which moves the scriber 54 and scanning head 56.

FIG. 3 is a schematic diagram showing representative optical fibers 58 in the scanning head 56 with their photoelectric cells 62 connected in electrical bridge circuits generally designated B for operating the logic control circuits and related equipment. The lower end of the scanning head is shown with one end of the optical fibers 58 terminated annularly around the end of the scanning head 56. As previously explained, the optical fibers are terminated in pairs annularly around the scanning head at equal distances out from the center of the scanning head. In the preferred embodiment of the invention, three annular arrays forming an inner ring 70, a central ring 71 and outer ring 72 of optical fiber pairs are employed for providing sensing capabilities from any direction to perform the functions of the plotter, to be explained, more fully, later. Twelve optical fiber pairs are shown equally spaced around each annular array of optical fiber pairs, and the fiber pairs in each annular array are located in radial columns from the center of the scanning head.

As can be seen in the enlarged representative view of FIG. 3 showing the ends of the optical fibers 58 in the scanning head 56, the guide lines encountered by the fibers, for example, guide line 66, are comparatively large in relation to the diameter of the fibers which may be as small as 0.001" or less.

When the sheet 12 is illuminated locally the optical fibers 58 of the fiber pairs will pick up and transmit some of the divergent light reflected from the sheet 12 into the optical fibers 58b at less than the critical angle of incidence. The illumination and pick up of light is accomplished by the optical fiber pairs, one fiber 58a of the pair transmits light from a light source 68 to a position where the light will be intercepted by the sheet 12. As previously explained, the other fiber 58b of the pair picks up some of the reflected light from the sheet and transmits it to the photoelectric cell associated therewith. When a fiber pair is over the white or light colored sheet, light will be reflected from the sheet. But if a fiber pair is over a dark guide line, very little light will be reflected from the sheet, and hence a different signal will be produced by the photoelectric cell associated with the fiber over the guide line.

Since the plotter of the present invention is used to perform two separate functions through the use of optical fibers, one being the self-monitoring function of sensing the existence of the line scribed and the other being the self-programming function of sensing the existence of guide lines to operate the plotter in a predetermined manner, different annular arrays of optical fibers are used for each function. In order that the self-programming function of the plotter and the self-monitoring function are not confused by the different annular arrays of optical fibers in performing their separate line pick-up functions, color perception can be used. Color perception is achieved by inserting light filters 75 and 77 of two different kinds into various paths between the light source 68 and optical fibers 58a associated with the two different-end functions of the plotter. The proper color perception is achieved by having one set of filters 75 of a type to effectively eliminate light of a color of the guide lines for performing the self-programming function. By this arrangement light of the color of the guide line is eliminated by the filter, and hence when the fiber 58a for transmitting such light is over a guide line essentially no light will be reflected and picked up by the associated fiber 58b of the fiber pair. But if no guide line is present under the fiber pair, light will be reflected by the sheet and picked up by the fiber 58b of the pair.

In the same manner, the other set of filters 77 are of a type to effectively eliminate light of a color of the line scribed, which is of a different color from the guide lines. By this arrangement, when a fiber pair associated with the self-monitoring function is over the line scribed, essentially no light will be reflected by the line scribed for transmission to a photoelectric cell. But if the last mentioned fiber pair is over the white sheet or a guide line, light will be reflected for transmission to a photoelectric cell. In this manner, the fiber pairs used for sensing the guide lines will not sense the line scribed, and the fiber pairs used for sensing the line scribed will not sense the guide lines. Thus, the separate functions of the plotter can be performed independently with great precision.

In the center of the scanning head in FIG. 3, the fiber array has been divided into quadrants as shown at 79, the quadrant dividing lines being parallel to the x-axis and y-axis, respectively. Also, the fibers 58b have been connected with the bridge circuits B by quadrants. This is desirable for accurate and precise operation of the plotter in a predetermined manner to draw a particular geometrical pattern, to be explained later.

The photoelectric cells 62 of the optical fibers 58b, which pick up the light signal reflected from the sheet 12, are connected into arms of bridge circuits, such as bridge circuits B in FIG. 3. As can be seen, each photoelectric cell 62 associated with an optical fiber 58b is connected in an arm of a bridge circuit. In bridge circuits B the batteries 76 and 78 in arms a and b, respectively, form common arms of a bridge circuit for each of the parallel connected sets of arms c and d, e and f, g and h, and i and j. More specifically, the positive terminal of battery 76 and the negative terminal of battery 78 are connected to a common electrical ground, and the negative terminal of battery 76 and the positive terminal of battery 78 are injunctions for the parallel connected sets of arms which form separate bridge circuits for the potentials derived at junctions k, l, m and n. Each of the bridge arms d, f, h and j have connected therein a photoelectric cell 62 of an associated optical fiber 58b connected in the scanning head 56. Each of the bridge arms c, e, g and i have connected therein a variable resistor $R_1$, $R_2$, $R_3$ and $R_4$, respectively, which is adjusted to a value to produce at junctions k, l, m and n, respectively, a potential of zero volts when the light supplied to the photoelectric cell is from either an optical fiber associated with performing the self-programming function that is over a guide line, or from an optical fiber associated with performing the self-monitoring function that is over the line scribed. The adjustment of the variable resistors is also such that a potential of minus 6 volts is produced at the associated junction when the light supplied to the photoelectric cell is from either an optical fiber associated with performing the self-programming function that is not over a guide line or from an optical fiber associated with performing the self-monitoring function that is not over the line scribed.

The junctions k, l, m and n of the bridge circuits are connected to the logic control circuits 83 for programming the plotter in its self-monitoring or self-programming functions, depending on the function the associated optical fibers are connected to perform. The logic control circuits 83 operate the drive units 38 and 46 for positioning the plotter head apparatus in performing the self-programming function. The bridge circuits of the optical fibers used in performing the self-monitoring function are connected to the logic control circuits for operating the line failure alarm circuit 81, which sounds an alarm or cuts off the plotter when the line being scribed is not sensed by at least one of the optical fibers connected for that function.

The logic control circuits comprise a plurality of electronic components and circuits of a conventional type connected in a predetermined manner for operating the plotter to draw desired geometrical patterns. The electronic components and circuits of the logic control circuits can be selected as needed to produce desired programming results, as by means of a terminal plug board to plug leads into the input and output terminals of the electronic circuits to connect them in a manner to produce the desired result. The logic control circuits contain electronic components and circuits such as transistorized power amplifiers, hereinafter referred to as drivers, solenoids, timer circuits, square wave generators, multivibrators; counter circuits; AND gates, OR gates; and NAND gates. These components and electronic circuitry are connected in a manner to be responsive to the input pulses from the bridge circuits, which are connected to supply outputs representative of areas scanned by the optical fibers in performing the self-monitoring and self-programming functions of the plotter. The logic control circuits produce a first output in response to the input signal for performing the self-programming function which operates the drive units to scribe patterns, such as patterns 14 and 16 in FIG. 1.

FIG. 4 illustrates the detail connection of various components of the logic control circuits for operating the plotter to produce pattern 14, shown in FIG. 1. The connection shown in FIG. 4 is for performing the self-programming function of the plotter which will now be explained. The connections for operating the line failure alarm circuit will be explained later. The lines 80 and 82 in FIG. 1 represent guide lines which are to be sensed by the optical fibers in the scanning head 56 to cause movement of the plotter head apparatus to make pattern 14. The outputs of the bridge circuits containing the photoelectric cells of the associated second quadrant inner ring of optical fibers from the scanning head in FIG. 3 are connected into AND gate 84 in FIG. 4, and the outputs of the bridge circuits containing photoelectric cells of the associated second quadrant outer ring of optical fibers from the scanning head in FIG. 3 are connected into AND gate 92 in FIG. 4 for programming the plotter to stop the x drive unit 38 and start the y drive unit 46 when guide line 80 is sensed. The AND gates provided herein have the characteristic of giving an output of minus 6 volts if all the input voltages from the associated bridge circuits are minus 6 volts, and an output of zero volts if any input voltage is at a potential of zero volts.

In like manner, the outputs of the bridge circuits containing the photoelectric cells of the associated fourth quadrant inner ring of optical fibers from the scanning head in FIG. 3 are connected into AND gate 102 in FIG. 4 and the outputs of the bridge circuits containing photoelectric cells of the associated fourth quadrant outer ring of optical fibers from the scanning head in FIG. 3 are connected into AND gate 104 in FIG. 4 for programming the plotter to stop the y drive unit 46 and start the x drive unit 38 when guide line 82 is sensed.

The start switch S which is used to start the plotter has one side connected to ground and the other side connected to the set side 105 of a bi-stable multivibrator generally designated 106. The multivibrator 106 has two sides, a set side 105 and a reset side 107, which sides also designate the two conditions that the bi-stable multivibrator assumes. When a zero voltage signal level is applied to the set side 105 or reset side 107 of the multivibrator 106, the signal causes the multivibrator to assume the set or reset condition, respectively. When the multivibrator is in the set condition a minus 6 volt output appears on the output of the set side and zero voltage output level is produced at the output of the reset side. When the multivibrator is in the reset condition a minus 6 volt potential appears on the output of the reset side and a zero volt output level is produced on the set side.

The inputs to the logic control circuits from the bridge circuits for the second and fourth quadrant inner rings of optical fibers are connected to opposite sides of multivibrator 106, by having the set side 105 responsive to the signal from AND gate 102 and the reset side 107 responsive to the signal from AND gate 84. The output of the multivibrator on the set side 105 is supplied to NAND gates 108 and 110. The NAND gates herein employed have the characteristic that when all the inputs are at minus 6 volts the output is clamped to zero volts and when any input goes to zero volts the output is clamped to minus 6 volts. The AND gate 92, which has its input supplied from the bridge circuits for the second quadrant outer ring of optical fibers, has its output connected to NAND gate 110.

The output of the reset side of the multivibrator 106 is connected into NAND gates 112 and 114. NAND gate 114 also has an input supplied from the bridge circuits from the fourth quadrant outer optical fibers through the connection of AND gate 104.

The outputs of NAND gates 108, 110, 112 and 114 are connected through diodes 111, 113, 115 and 117, respectively, to motor drivers 116, 118, 120 and 122, respectively. The motor drivers may be transistorized power amplifiers to supply the proper signal level to operate the various motors 45, 47, 51 and 53. In response to a signal level of 0 volt from an associated NAND gate, the motor drivers will operate their associated motor. When the signal from the associated NAND gate is minus 6 volts, the motor drivers cause their associated motors to be in their "off" condition. The motor drivers 116, 118, 120 and 122 are connected to the respective slow $x$ motor 45, fast $x$ motor 47, fast $y$ motor 51 and slow $y$ motor 53, respectively. The fast and slow $x$ motors are coupled through differential 49 and the fast and slow $y$ motors are coupled through differential 55, so that the vector sum of the movements of the $x$ motors or $y$ motors is applied to their respective drive bands 40 and 48.

In operation of the logic control circuits of FIG. 4, when it is desired to make pattern 14, the start switch S is closed and the plotter head apparatus is brought to point 123 on sheet 12, shown in FIG. 1. As long as the start switch S is held closed the plotter logic control circuit will be oblivious to optical signals, and hence the plotter head apparatus can be started in a region of guide lines without being responsive when it encounters the guide lines. This condition exists in the present connection of the logic control circuit since the closed start switch gives a zero volt input to the set side of multivibrator 106, causing a minus 6 volt output at the output of the set side, thus applying the proper input to NAND gate 108 to operate the slow $x$ motor. The fast $x$ motor will operate after the scanning head has been moved away from the area of any guide lines, as will now be explained in detail. After the start switch S has been released, multivibrator 106 will be in its set condition and will remain in that condition until a zero voltage signal level is received at the input on the reset side 107 of the multivibrator. With the multivibrator in the set condition, the output will be minus 6 volts and is applied to NAND gates 108 and 110. This input to NAND gate 108 will cause it to have a zero volt output which is the proper signal to motor driver 116 in order for the slow $x$ motor to be operated. The inputs to NAND gate 110 are both minus 6 volts, one supplied from the set side 105 of the multivibrator 106 and the other supplied from AND gate 92, which has its input at minus 6 volts from its associated bridge circuits since the fibers are not sensing a guide line. Hence, the output of NAND gate 110 is zero volts, which is the proper voltage to have motor drive 118 operate the fast $x$ motor 47. By this arrangement, the differential 49 will apply the vector sum of the movements of the $x$ motors 45 and 47 to move the slide carriage 26 in the minus $x$-axis direction, as determined by the initial connection of the circuit, until the second quadrant outer ring of optical fibers sense guide line 80 in FIG. 1.

When any of the second quadrant outer ring of optical fibers are over the guide line 80, a zero voltage signal level output will appear from the associated bridge circuit, and a zero voltage signal level input will be applied to AND gate 92 and hence NAND gate 110. This signal level will cause NAND gate 110 to have an output of minus 6 volts. The minus 6 volt output from NAND gate 110 will cause the motor driver to stop operating the fast $x$ motor 47. By this occurrence, the slow $x$ motor 45 will be the only motor operating.

When any of the second quadrant inner ring of optical fibers sense guide line 80, the output of the associated bridge circuits to AND gate 84 will be at a zero volt signal level, thus supplying a zero volt input to the reset side 107 of multivibrator 106 causing it to change states from its set to reset conditions. The multivibrator 106 in the reset condition produces an output from the set side of zero volts, and a zero volt signal level input to NAND gate 108 will cause an output of minus 6 volts to be applied to motor drivers 116, hence stopping the slow $x$ motor. The multivibrator 106 being in the reset condition will give a minus 6 volt output on the reset side 107. This voltage level applied to NAND gates 112 and 114 will give a zero volt signal level output from the NAND gates, causing the slow and fast $y$ motors 51 and 53, respectively, to operate. By this arrangement, the negative $y$-axis movement of the plotter head apparatus is produced.

In a similar manner, when any of the fourth quadrant outer ring of optical fibers sense guide line 82 a zero volt signal level from their associated bridge circuit will be applied to AND gate 104, and hence to NAND gate 114. In response to the zero voltage signal level, NAND gate 114 will produce an output of minus 6 volts, which supplied to motor driver 122 will turn off the fast $y$ motor 53. As any of the fourth quadrant inner ring of optical fibers encounter guide line 82, the output of the associated bridge circuit will have a zero voltage signal level, thus changing the multivibrator 106 from its reset to set condition. When the multivibrator is in its set condition, a minus 6 volt potential is applied to NAND gates 108 and 110 from the set side of the multivibrator, and in response to the output of the NAND gates, motor drivers 116 and 118 will operate the slow and fast $x$ motors. The multivibrator being in its set condition will supply zero volt signal level input to NAND gate 112, which will cause the NAND gate 112 to have an output of minus 6 volts, thus causing the motor driver 120 to cease operating the slow $y$ motor 51. In this manner by the use of guide lines 80 and 82, the plotter performs a self-programming function in drawing pattern 14. The same process is repeated each time the second quadrant optical fibers encounter guide line 80 and the fourth quadrant optical fibers encounter guide line 82.

Figure 5:
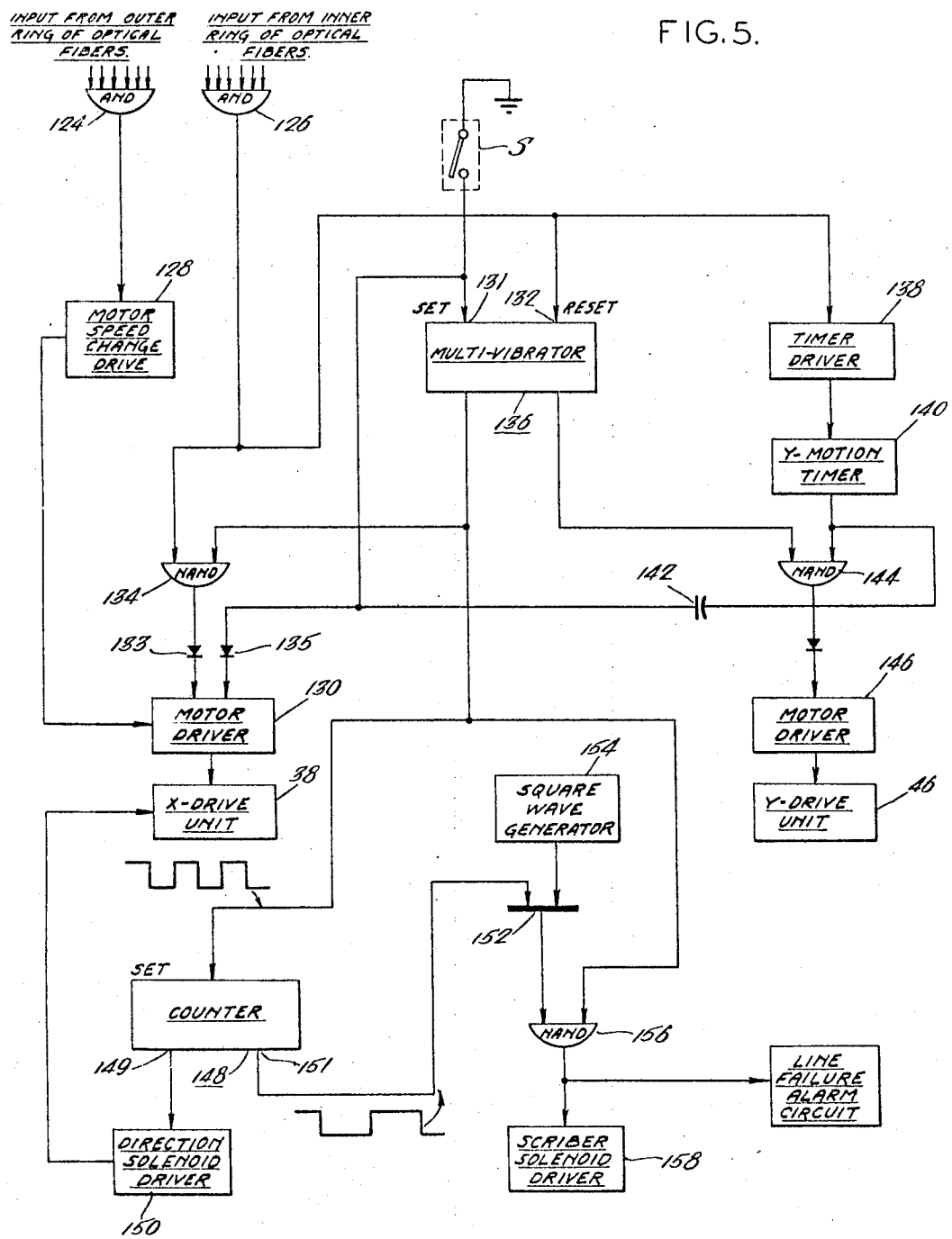
FIG. 5 is a block diagram of another logic control circuit for producing another of the patterns shown in FIG. 1.

FIG. 5 illustrates the detail connection of various components of the logic control circuits for operating the plotter to draw pattern 16, shown in FIG. 1. Many of the components used in the system in FIG. 4 are used in the system illustrated in FIG. 5 by reconnecting the components into the circuit of FIG. 5 as by means of the terminal plug board arrangement as noted previously. The lines 160 and 162 in FIG. 1 represent guide lines which are to be sensed by the optical fibers in the scanning head 56 to actuate the plotter to draw pattern 16. The outputs of all the bridge circuits associated with the outer ring of optical fibers are connected to AND gate 124, and the output of all the bridge circuits associated with the inner ring of optical fibers are connected to AND gate 126. The AND gate 124 is connected to motor speed change driver 128 which is a power amplifier having two conditions of its output depending on its input signal. When the signal to motor speed change driver 128 is minus 6 volts from AND gate, the outer ring of optical fibers not being over a guide line, the motor speed change driver will supply a signal to motor driver 130 to cause it to operate the $x$ drive unit 38 in its fast state. If the signal to motor speed change driver 128 from AND gate 124 is zero volts, the outer ring of optical fibers being a guide line, the motor speed change driver will supply a signal to motor driver 130 to cause it to operate the $x$ drive unit in its slow state.

The output of AND gate 126 is supplied to NAND gate 134, the reset side 132 of bistable multivibrator 136, and timer driver 138. The bistable multivibrator 136 has two sides, a set side 131 and a reset side 132, which sides also designate the two conditions that the bistable multivibrator assumes. Multivibrator 136 operates in the same manner as described in regard to multivibrator 106 in FIG. 4. Another input to multivibrator 136 is supplied through start switch S, which has one side connected to the set side of the multivibrator and the other side of switch S is connected to electrical ground. The output of the set side of multivibrator 136 is supplied to NAND gate 134, NAND gate 156 and scale of two counter 148, having 2 output signals in response to an input signal for counting down by a scale of 2 to 1 the times the $x$ drive unit is energized. The output at the reset side 132 of multivibrator 136 is connected to NAND gate 144.

Timer driver 138, which is a power amplifier, is used to provide the proper signal level to operate timer 140. The timer produces an output signal of minus 6 volts for a specified time in response to an input signal of minus 6 volts, then the timer output becomes zero volts. The timer driver 138 supplies an input signal to timer 140 in response to a zero volt signal level from AND gate 126. The timer 140 may be a monostable multivibrator with proper D.C. level voltage adjustment or a cam-operated multiple-contact relay-controlled timer circuit for connecting the input directly to the output for a set time.

The NAND gate 144 has two inputs, one supplied from the output of the reset side of multivibrator 136 and the other from the output of timer 140. The NAND gates shown in FIG. 5 operate in the same manner as described in regard to the NAND gates in FIG. 4. If both the inputs to NAND gate 144 are minus 6 volts, its output supplied to motor driver 146 will be zero volt, which is the correct signal level for the motor driver 146 to operate $y$ drive unit 46. In this arrangement, the motor driver 146, which is a power amplifier, can be connected to operate one or the other of the $y$ motors 51 or 53, since variable speed feature is not needed. Here $y$ motor 51 is used.

The coupling of the output from timer 140 through capacitor 142 to motor driver 130 and the set side of multivibrator 136 provides, first, a means for changing the state of the multivibrator so that it will provide the proper output to operate the $x$ drive unit, and secondly, an initial voltage level of zero volts when timer 140 turns off in order to start the motor driver and $x$ drive unit operating to move plotter head apparatus away from the guide line it is over when the plotter head apparatus stops traveling in the $y$-axis direction. The inputs to motor driver 130 from NAND gate 134 and timer 140 are connected through diodes 133 and 135, respectively.

The connection of the set aside of multivibrator 136 to counter 148 is for the purpose of providing output signals from the counter, firstly, to regulate the direction the $x$ drive unit will move the plotter head apparatus, secondly, to regulate whether the scriber is against sheet 12, and thirdly, to regulate the condition of the alarm circuit for indicating the failure of the scriber to draw a line. More specifically, counter 148 changes state, changing its outputs at terminals 149 and 151, in response to a negative-going input from multivibrator 136, which corresponds to counting to change states by a scale of 2 to 1, that is, the counter changes states for every other change of state of multivibrator 136. In one state the counter will provide output levels at terminals 149 and 151 of zero volts and minus 6 volts, respectively, and in its other state the counter will provide output levels at terminals 149 and 151 of minus 6 volts and zero volts, respectively. A zero volt output at terminal 149 supplied to direction solenoid driver 150, which is a power amplifier, will cause the direction solenoid driver to operate the $x$ drive unit to move the plotter head apparatus in the positive $x$-axis direction. However, a minus 6 volt input to direction solenoid driver 150 will turn it off and the $x$ drive unit will move the plotter head apparatus in the negative $x$-axis direction.

As can be seen in FIG. 5, the output at terminal 151 of counter 148 is supplied to OR gate 152, which has a second input supplied by square wave generator 154. The output of the square wave generator alternates between zero and minus 6 volts to regulate the scriber to skip spaces in drawing dashed lines.

The inputs to NAND gate 156 are supplied by the set side of multivibrator 136 and OR gate 152. If both inputs to NAND gate are minus 6 volts, its output which is supplied to scriber solenoid driver 158 will be at a zero volt potential, and the scriber will be down against sheet 12 to draw a line. If the input from OR gate 152 to NAND gate 156 alternates between zero and minus 6 volts, the output of NAND gate 156 will alternate between zero and minus 6 volts, which will cause the scriber solenoid driver 158 to actuate solenoid 61 to alternately raise and lower the scriber, producing dashed lines. A minus 6 volt signal level to scriber solenoid driver 158 will result in the solenoid 61 raising the scriber away from sheet 12 so that no line will be scribed. The output of NAND gate 156 is also coupled to the line failure alarm circuit which is associated with the self-monitoring function of the plotter, to be described later.

In the operation of the electrical system of FIG. 5, the start switch S is closed and the plotter head apparatus is brought to a point $q$ on pattern 16. As long as the start switch S is held closed the plotter system will not be responsive to optical signals picked up by the optical fibers when guide lines are crossed, and hence the plotter head apparatus can be brought into the proper position without being stopped as it encounters guide lines. For drawing pattern 16 shown in FIG. 1, the only guide lines required are guide lines 160 and 162.

With the start switch S closed, multivibrator 136 will be in its set condition in response to the zero volt signal level. The two inputs to NAND gate 134 being minus 6 volts, one from the set side of multivibrator 136 and the other from AND gate 126, its output level of zero volts supplied to motor driver 130 will actuate the motor driver to operate $x$ drive unit 38 to move the plotter head apparatus along the $x$-axis in a positive $x$ direction to draw a solid line. This direction of travel and type of line drawn are correct when the counter 148 operates in a manner as will now be explained.

The scale of two counter 148 in response to the minus 6 volt signal from the set side 131 of multivibrator 136 will have an output level at terminal 149 of zero volts, thus operating direction solenoid driver 150 to cause the $x$ drive unit to move the plotter head in the positive $x$-axis direction. The output of counter 148 at terminal 151 will be minus 6 volts supplied to OR gate 152, thus providing both inputs to NAND gate 156 at the minus 6 volt level, one input from OR gate 152 and the other from the set side of multivibrator 136. In response to the zero volt signal level from NAND gate 156, the scriber solenoid driver 158 will not be operating and scriber 54 will ride on sheet 12 to scribe a solid line, as line 164 in pattern 16. As line 164 is scribed the $x$ drive unit will be operating in its fast condition in response to the signal from motor speed change driver 128, since the signal supplied to driver 128 is from the bridge circuits of fibers which are not over a guide line.

When any of the outer rings of optical fibers in the scanning head 56 encounter guide line 162, a signal level of zero volts from the associated bridge circuit will be applied to AND gate 124. The motor speed change driver in response to the zero volt signal level will provide an output signal level to motor driver 130 which will cause the fast $x$ motor of the $x$ drive unit to stop operating.

As the inner ring of optical fibers encounter guide line 162 the output signal level of their associated bridge circuits will be zero volts supplied to AND gate 126. This signal level at the output of AND gate 126 is applied simultaneously to NAND gate 134, the reset side of multivibrator 136 and timer driver 138. The NAND gate 134 in response to the zero volt signal level will provide an input signal of minus 6 volts to motor driver 130, which will cause the slow x motor in x drive unit 38 to stop. In response to the zero voltage level input to the reset side of multivibrator 136, the multivibrator will change to its reset condition thereby providing an output level on the set side of zero volts supplied to NAND gate 134, counter 148 and NAND gate 156, and an output on the reset side of minus 6 volts supplied to NAND gate 144. In response to the zero voltage input to timer driver 138, the timer driver will supply an output to start the timer 140, causing the timer to produce an output of minus 6 volts for a predetermined period of time. The two inputs of NAND gate 144 now being minus 6 volts, one supplied by timer 140 and the other from the reset side of multivibrator 136, the output level of the NAND gate of zero volts will cause motor driver 146 to operate the y drive unit 46 to move the plotter head in the negative y-axis direction.

The signal level of zero volts supplied to the counter from the set side of multivibrator 136 does not affect the state of the counter, since the counter only changes states when there is a negative-going output from the set side of the multivibrator.

The zero volt output from the set side of multivibrator 136 supplied to NAND gate 156 will cause the NAND gate to have an output of minus 6 volts supplied to the scriber solenoid driver 158. In response to the minus 6 volt input, the scriber solenoid driver 158 will cause solenoid 61 to elevate scriber 54 above sheet 12 so that when the plotter head travels in the negative y-axis direction a line will not be drawn by the scriber.

After the timer 140 has been on the preset amount of time, it will automatically be actuated off and its output level will change to a value of zero volts. In response to the zero volt signal level input, NAND gate 144 supplies a minus 6 volt output which changes motor driver 146 to its "off" condition, thus turning off y drive unit 46. The output of the y motor timer 140 coupled through capacitor 142 to the set side of multivibrator 136 and motor driver 130 changes the multivibrator to its set condition and the drive unit will start operating to move the plotter head apparatus along the x-axis away from guide line 162. In accordance with arrangement, the multivibrator 136 in response to the zero volt signal level from the timer, produces an output of minus 6 volts on the set side which is supplied to counter 148 and NAND gates 134 and 156. The counter in response to the minus 6 volt signal changes states to provide outputs at terminals 149 and 151 of minus 6 volts and zero volts, respectively. The output at terminal 149 supplied to direction solenoid driver 150 turns the driver off, thus the x drive unit will move the plotter head apparatus in the negative x-axis direction.

The plotter head apparatus having been moved away from guide line 162 and both inputs to NAND gate 134 being minus 6 volts, the output from NAND gate 134 supplied to motor driver 130 will cause the x drive unit to continue to move the plotter to draw line 165.

To generate the desired dashed line when the plotter head apparatus moves in the negative x-axis direction, the square wave generator 154 is employed. The inputs to OR gate 152 are zero volts from the counter and alternately zero and minus 6 volts from the square wave generator. Hence, the NAND gate 156 in response to the inputs from OR gate 152 and the set side of multivibrator 136 will produce an output which varies alternately between zero and minus 6 volts. By this arrangement, the alternating input to scriber solenoid drive 158 will cause solenoid 61 to raise and lower the scriber 54 alternately to make dashed line 165.

In a similar manner, when the scanning head encounters guide line 160 the x motors will be turned off and the y motors will be turned on, causing the plotter head to move down guide line 160 for a distance determined by the setting of timer 140. After the timer has turned off, the multivibrator 136 will be changed from its reset to set conditions by the signal from timer 140 supplied to the multivibrator. This change by the multivibrator will start the x drive unit to operate in the positive x-axis direction, resulting from the output of the multivibrator 136 supplied to counter 148 to produce actuation of the solenoid driver 150 to its "on" condition. Hence, the x drive unit will travel in the positive x-axis direction. By the above arrangement the plotter head apparatus moves between guide lines 160 and 162 to draw pattern 16 shown in FIG. 1.

Figure 6:
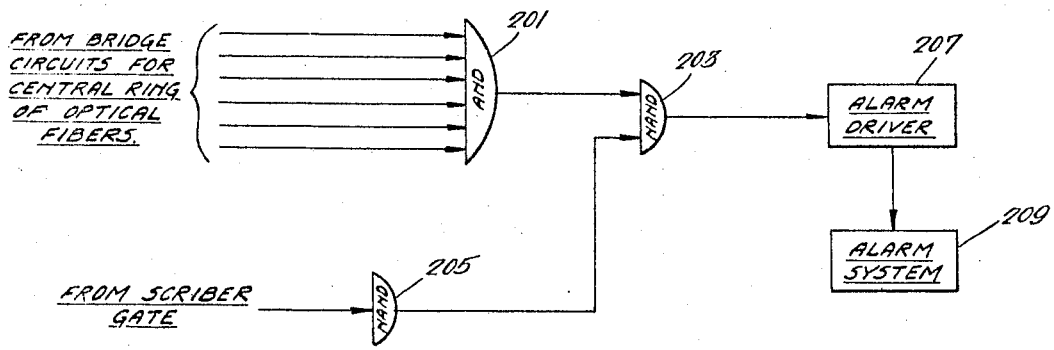
FIG. 6 is a block diagram of the line failure alarm circuit.

The plotter performs the self-monitoring function through the use of the optical fibers pairs in the central ring of optical fiber pairs. By the circular array of fibers in the scanning head, the line drawn by the scriber is sensed by at least one optical fiber irregardless of the direction the plotter head is proceeding. The optical fibers, which pick-up the light signal from sheet 12, have their photocells connected into bridge circuits similar to the bridge circuit generally designated B. The output of the bridge circuits are connected to AND gate 201, shown in FIG. 6. FIG. 6 illustrates one embodiment of a system in the logic control circuits for operating a line failure alarm circuit. The output of the AND gate 201 is connected to NAND gate 203, which has another input supplied from the output of NAND gate 205. The NAND gate 205 is responsive to the output of NAND gate 156, shown by the connection from the output of NAND gate 156 going to the line failure alarm circuit in FIG. 5. The output from NAND gate 156, shown in FIG. 5, is connected through NAND gate 205 shown in FIG. 6, in order to provide the proper signal to be supplied to NAND gate 203. The output of NAND gate 203 is connected to the alarm driver 207, which supplies the power to trigger "on" alarm 209. The alarm driver 207 can operate an alarm such as a bell or a master control switch which will turn the plotter off when the line drawn ceases to be detected by any of the optical fibers in the central ring of fibers.

In operation, when the scriber is down the output signal level from NAND gate 156 will be zero volts supplied to NAND gate 205, which will provide a minus 6 volt output in response to the zero volt input. Also, when the scriber is down and a line is being scribed, at least one of the outputs from the bridge circuits for the central ring or array of optical fibers will be zero volt, indicating that a fiber is over the line being drawn by the scriber. A zero voltage level input from a bridge circuit to AND gate 201 will produce a zero volt output. In response to the zero volt input, NAND gate 203 will produce a minus 6 volt output, which is not the proper signal level to trigger the alarm driver to operate the alarm. However, if the scriber is down against sheet 12 and the scriber ceases to draw a line, the bridge circuits for the central optical fibers will all produce a minus 6 volt output supplied to AND gate 201. In response to these signals from the bridge circuits, the AND gate produces a minus 6 volt signal to NAND gate 203, thus providing an output signal level to alarm driver 207 of zero volt. Hence, the alarm driver will trigger the alarm to ring a bell or actuate a switch to turn the plotter off. In this manner, the plotter of the present invention performs a self-monitoring function by indicating instantaneously when the scriber ceases to draw a desired line.

The arrangements of the logic control circuits disclosed in FIGS. 4 and 5 are merely examples of the capability of connecting the circuits in order to use the present invention to perform self-programming functions to trace desired lines, graphs, grid systems and other figures. The plotter of the present invention could employ the use of coded strips, such as disclosed in my co-pending application entitled "Filamentary Photocell Device," cited above. The coded strips can be used to regulate, for example, the length of the dashes in a dashed line by having a row of fibers move down a column to provide signals to raise and lower the scriber.

Another capability of the present invention is to connect the outputs of the logic control circuits of one plotter to a number of motors controlling associated plotter head apparatuses, and, by this arrangement, duplicate patterns can be made simultaneously with only one set of guide lines to program one plotter head apparatus.

Other modifications of the plotter and its system described herein will occur to those skilled in the art. All such modifications are intended to be within the scope and spirit of the present invention as defined by the appended claims.

I claim:
1. A drawing plotter comprising:
  a frame for supporting the plotter including means defining a support surface for supporting inscribable means on which lines can be drawn and from which light can be reflected,
  a plotter head apparatus including a scriber and a scanning head cooperating with said surface, said scanning head comprising optical fibers with their ends in an array and positioned to pick up light reflected from said inscribable means,
  plotter head drive means for producing movement of said plotter head apparatus in a predetermined manner to draw lines on said inscribable means in accordance with said movement and to move said plotter head apparatus for picking up light reflected from said inscribable means over the area of said movement,
  photosensitive devices associated with at least some of said optical fibers,
  circuit means coupled to said photosensitive devices for providing outputs indicative of the response of said photosensitive devices to light picked up by individual optical fibers associated therewith,
  and control circuit means for coupling said outputs of said circuit means to said drive means to cause said drive means to move said plotter head apparatus in said predetermined manner.

2. The drawing plotter of claim 1 in which said array of optical fibers in said scanning head is distributed in an annular pattern around said scanning head, said scriber being located in the center of said scanning head.

3. A drawing plotter comprising:
  a frame for supporting the plotter and including means defining a support surface for supporting inscribable means on which lines can be drawn and from which light can be reflected,
  a plotter head apparatus including a scriber and a scanning head cooperating with said surface, said scanning head comprising optical fibers with their ends in an array positioned to pick up light reflected from said inscribable means,
  plotter head drive means for producing movement of said plotter head apparatus in a predetermined manner to draw lines on said inscribable means in accordance with said movement and to move said plotter head apparatus for picking up light reflected from said inscribable means over the area of said movement,
  photosensitive devices associated with at least some of said optical fibers,
  circuit means coupled to said photosensitive devices for providing outputs indicative of the response of said photosensitive devices to light picked up by individual optical fibers associated therewith,
  and control circuit means for coupling said outputs of said circuit means to said drive means to cause said drive means to stop when the line drawn by said scriber and sensed by said optical fibers ceases to be detected when said scriber moves against said inscribable means.

4. The drawing plotter of claim 3 in which said array of optical fibers in said scanning head is distributed in an annular pattern around said scanning head, said scriber being located in the center of said scanning head.

5. A drawing plotter comprising:
  a frame for supporting the plotter including means defining a support surface for supporting inscribable means on which lines can be drawn and from which light can be reflected,
  a plotter head apparatus including a scriber and a scanning head cooperating with said surface, said scanning head comprising optical fibers with their ends in an array and positioned to pick up light reflected from said inscribable means,
  plotter head drive means for producing movement of said plotter head apparatus in a predetermined manner to draw lines on said inscribable means in accordance with said movement and to move said plotter head apparatus for picking up light reflected from said inscribable means over the area of said movement,
  photosensitive devices associated with at least some of said optical fibers,
  circuit means coupled to said photosensitive devices for providing outputs indicative of the response of said photosensitive devices to light picked up by individual optical fibers associated therewith,
  and control circuit means for coupling a plurality of said outputs of said circuit means to said drive means to cause said drive means to move said plotter head apparatus in said predetermined manner, said control circuit means being connected to other of said outputs of said circuit means for coupling said outputs to said drive means to cause said drive means to stop when the line drawn by said scriber and sensed by said optical fibers ceases to be detected when said scriber moves against said inscribable means.

6. The drawing plotter of claim 5 further comprising means for illuminating said inscribable means beneath said scanning head in such a manner that light reflected from said inscribable means will be picked up by various of said optical fibers.

7. The drawing plotter of claim 6 in which said means for illuminating said inscribable means beneath said scanning head comprises a source of light arranged to have light therefrom transmitted along individual optical fibers in said scanning head, whereby said light from said source transmitted along said individual optical fibers will be intercepted and reflected by said inscribable means to be picked up by said optical fibers associated with said photosensitive devices.

8. A drawing plotter comprising:
  a drawing board providing a plane drawing surface;
  bridge means movable across said drawing board;
  bridge drive means fixed with respect to said drawing board for moving said bridge means;
  a plotter head apparatus including a scriber and a scanning head cooperating with said surface, said scanning head comprising optical fibers with their ends in an array and positioned to pick up light reflected from said surface;
  plotter head drive means for producing movement of said plotter head apparatus along said bridge means;
  said bridge drive means and said plotter head drive means producing movement of said plotter head apparatus in a predetermnied manner to draw lines in accordance with said movement and to move said plotter head apparatus for picking up light reflected from said surface over the area of said movement, photosensitive devices associated with at least some of said optical fibers;

circuit means coupled to said photosensitive device for producing outputs indicative of the response of said photosensitive devices to light picked up by individual optical fibers associated therewith;

and control circuit means for coupling said outputs of said circuit means to said drive means to cause said drive means to move said plotter head apparatus in said predetermined manner.

9. A drawing plotter comprising:

a drawing board providing a plane drawing surface;

bridge means movable across said drawing board;

bridge drive means fixed with respect to said drawing board for moving said bridge means;

a plotter head apparatus including a scriber and a scanning head cooperating with said surface; said scanning head comprising optical fibers with their ends in an array and positioned to pick up light reflected from said surface, plotter head drive means for moving said plotter head apparatus along said bridge means; said bridge drive means and said plotter head drive means producing movement of said plotter head apparatus in a predetermined manner to draw lines in accordance with said movement and to move said plotter head apparatus for picking up light reflected from said surface over the area of said movement;

photosensitive devices associated with at least some of said optical fibers;

circuit means coupled to said photosensitive devices for producing outputs indicative of the response of said photosensitive devices to light picked up by individual optical fibers associated therewith;

and control circuit means for coupling said outputs of said circuit means to said drive means to cause said drive means to stop when the line drawn by said scriber and sensed by said optical fibers ceases to be detected when said scriber moved against said surface.

10. A drawing plotter comprising:

a drawing board providing a plane drawing surface;

bridge means movable across said drawing board;

bridge drive means fixed with respect to said drawing board for moving said bridge means;

a plotter head apparatus including a scriber and a scanning head cooperating with said surface; said scanning head comprising optical fibers with their ends in an array and positioned to pick up light reflected from said surface;

plotter head drive means for moving said plotter head apparatus along said bridge means; said bridge drive means and said plotter head drive means producing movement of said plotter head apparatus in a predetermined manner to draw lines in accordance with said movement and to move said plotter head apparatus for picking up light reflected from said surface over the area of said movement;

photosensitive devices associated with at least some of said optical fibers;

circuit means coupled to said photosensitive devices for providing outputs indicative of the response of said photosensitive devices to light picked up by individual optical fibers associated therewith;

and control circuit means for coupling a plurality of said outputs of said circuits means to said drive means to cause said drive means to move said plotter head apparatus in said predetermined manner, said control circuit means being connected to other of said outputs of said circuit means for coupling said outputs of said circuit means to said drive means to cause said drive means to stop when the line drawn by said scriber and sensed by said optical fibers ceases to be detected when said scriber moves against said surface.

11. The drawing plotter of claim 9 in which said array of optical fibers in said scanning head is distributed in an annular pattern around said scanning head, said scriber being located in the center of said scanning head.

12. The drawing plotter of claim 10 further comprising means for illuminating said surface beneath said scanning head in such a manner that light reflected from said surface will be picked up by various of said optical fibers.

13. The drawing plotter of claim 12 in which said optical fibers coupled to said circuit means to perform said movement and said optical fibers coupled to said circuit means to cause said plotter to stop are arranged at different annular radiuses around said scanning head.

14. The drawing plotter of claim 12 in which said means for illuminating said surface beneath said scanning head comprises a source of light arranged to have light therefrom transmitted along individual illuminating optical fibers in said scanning head whereby said light from said source transmitted along said individual illuminating optical fibers will be intercepted and reflected by said surface to be picked up by said optical sensing fibers associated with said photosensitive devices.

15. The drawing plotter of claim 14 further comprising optical filters located between said scanning head and said photosensitive devices associated with some of said optical fibers, said optical fibers being located in pairs comprising one of said individual illuminating optical fibers and one of said optical sensing fibers associated with said photosensitive devices, said optical fiber pairs being arranged such that light transmitted by said individual illuminating optical fiber and reflected by said surface will be picked up by said optical sensing fiber associated with said photosensitive device to be transmitted to said photosensitive device.

16. The drawing plotter of claim 14 further comprising optical filters located between said source of light and said individual optical fibers which transmit light from said source for being intercepted by said surface, said optical fibers being located in pairs comprising one of said individual illuminating optical fibers and one of said optical sensing fibers associated with said photosensitive devices, said optical fiber pairs being arranged such that light transmitted by said individual illuminating optical fiber and reflected by said surface will be picked up by said optical sensing fiber associated with said photosensitive device to be transmitted to said photosensitive device.

17. The drawing plotter of claim 16 in which said optical filters are of two kinds, one kind which will effectively eliminate light of a color of the line being drawn by said scriber but will transmit light of a color of guide lines on said surface and another kind which will effectively eliminate light of the color of said guide lines but will transmit light of the color of the line drawn by said scriber.

18. A drawing plotter comprising:

a frame for supporting the plotter including means defining a support surface for supporting inscribable means on which lines can be drawn and from which light can be reflected, said inscribable means having programming guide means provided thereon, a plotter head apparatus including a scriber and a scanning head cooperating with said surface, said scanning head comprising optical fibers with their ends in an array and positioned to pick up light reflected from said inscribable means, photosensitive devices associated with at least some of said optical fibers, plotter head drive means for producing movement of said plotter head apparatus to draw lines on said inscribable means and to pick up light reflected from said inscribable means over the area of said movement, circuit means coupled to said photosensitive devices for providing outputs indicative of the response of said photosensitive devices to light picked up by individual optical fibers associated therewith and to cause outputs indicating when the programming guide means is in the light pick up position of at least one of the fibers, and control circuit means for coupling said outputs of said circuit means to said drive means to cause said drive means to move said plotter head apparatus in a predetermined manner.

19. The drawing plotter of claim 18 in which the programming means comprises guide lines drawn on the inscribable means to create a limit for movement of the plotter head apparatus.

20. The drawing plotter of claim 18 in which said array of optical fibers in said scanning head is distributed in an annular pattern around said scanning head, said scriber being located in the center of said scanning head.

21. The drawing plotter of claim 18 further comprising means for illuminating said inscribable means beneath said scanning head in such a manner that light reflected from said inscribable means will be picked up by various of said optical fibers.

22. The drawing plotter of claim 21 in which said means for illuminating said inscribable means beneath said scanning head comprises a source of light arranged to have light therefrom transmitted along individual optical fibers in said scanning head, whereby said light from said source transmitted along said individual optical fibers will be intercepted and reflected by said inscribable means to be picked up by said optical fibers associated with said photosensitive devices.

23. The drawing plotter of claim 22 further comprising an optical filter located between said source of light and said individual optical fibers which transmit light from said source for being intercepted by said surface, said optical fibers being located in pairs comprising one of said individual optical fibers and one of said optical fibers associated with said photosensitive devices, said optical fiber pairs being arranged such that light transmitted by said individual optical fiber and reflected by said surface will be picked up by said optical fiber associated with said photosensitive device to be transmitted to said photosensitive device.

24. The drawing plotter of claim 23 in which said programming guide means comprises at least one guide line drawn on said inscribable means and said optical filter effectively eliminates light of a color of the line being drawn by said scriber but will transmit light of a color of the guide line which is of a different color than the line scribed.

25. The drawing plotter of claim 20 in which said optical fibers in said scanning head are arranged in at least two annular patterns around said scanning head at different radii.

26. The drawing plotter of claim 22 further comprising an optical filter located between said scanning head and said photosensitive devices associated with at least some of said optical fibers, said optical fibers being located in pairs comprising one of said individual optical fibers and one of said optical fibers associated with said photosensitive devices, said optical fiber pairs being arranged such that light transmitted by said individual optical fiber and reflected by said surface will be picked up by said optical fiber associated with said photosensitive device to be transmitted to said photosensitive device.

27. The drawing plotter of claim 18 in which said array of optical fibers in said scanning head is distributed in an outer pattern and an inner pattern around said scanning head, said scriber being located within said patterns in said scanning head.

28. The drawing plotter of claim 27 in which said plotter head drive means includes fast drive means and slow drive means said control circuit means coupling outputs of said circuit means to said fast drive means and said slow drive means to cause said drive means to move said plotter head apparatus in said predetermined manner.

29. The drawing plotter of claim 27 in which said plotter head drive means includes fast drive means and slow drive means, said control circuit means coupling outputs of said circuit means associated with said outer pattern of optical fibers to said fast drive means and coupling outputs of said circuit means associated with said inner pattern of optical fibers to said slow drive means for causing movement of said plotter head apparatus in said predetermined manner.

30. A drawing plotter comprising:
a drawing board providing a plane drawing surface, said surface having programming guide means provided thereon;
bridge means movable across said drawing board;
bridge drive means fixed with respect to said drawing board for moving said bridge means;
a plotter head apparatus including a scriber and a scanning head cooperating with said surface, said scanning head comprising optical fibers with their ends in an array and positioned to pick up light reflected from said surface;
photosensitive devices associated with at least some of said optical fibers;
plotter head drive means for producing movement of said plotter head apparatus along said bridge means;
said bridge drive means and said plotter head drive means producing movement of said plotter head apparatus to draw lines and to pick up light reflected from said surface over the area of said movement;
circuit means coupled to said photosensitive devices for providing outputs indicative of the response of said photosensitive devices to light picked up by individual optical fibers associated therewith and to cause outputs indicating when the programming guide means is in the light pick up position of at least one of the fibers; and
control circuit means for coupling said outputs of said circuit means to said drive means to cause said drive means to move said plotter head apparatus in a predetermined manner.

31. The drawing plotter of claim 30 in which the programming guide means comprises guide lines drawn on the inscribable means to create a limit for movement of the plotter head apparatus.

32. The drawing plotter of claim 30 in which said array of optical fibers in said scanning head is distributed in an annular pattern around said scanning head, said scriber being located in the center of said scanning head.

33. The drawing plotter of claim 30 further comprising means for illuminating said inscribable means beneath said scanning head in such a manner that light reflected from said inscribable means will be picked up by various of said optical fibers.

34. The drawing plotter of claim 33 in which said means for illuminating said inscribable means beneath said scanning head comprises a source of light arranged to have light therefrom transmitted along individual optical fibers in said scanning head, whereby said light from said source transmitted along said individual optical fibers will be intercepted and reflected by said inscribable means to be picked up by said optical fibers associated with said photosensitive devices.

35. The drawing plotter of claim 34 further comprising an optical filter located between said source of light and said individual optical fibers which transmit light from said source for being intercepted by said surface, said optical fibers being located in pairs comprising one of said individual optical fibers and one of said optical fibers associated with said photosensitive devices, said optical fiber pairs being arranged such that light transmitted by said individual optical fiber and reflected by said surface will be picked up by said optical fiber associated with said photosensitive device to be transmitted to said photosensitive device.

36. The drawing plotter of claim 35 in which said programming guide means comprises at least one guide line drawn on said inscribable means and said optical filter effectively eliminates light of a color of the line being drawn by said scriber but will transmit light of a color of guide line which is of a different color than the line scribed.

37. The drawing plotter of claim 32 in which said optical fibers in said scanning head are arranged in at least two annular patterns around said scanning head at different radii.

38. The drawing plotter of claim 34 further comprising an optical filter located between said scanning head and said photosensitive devices associated with at least some of said optical fibers, said optical fibers being located in pairs comprising one of said individual optical fibers and one of said optical fibers associated with said photosensitive devices, said optical fiber pairs being arranged such that light transmitted by said individual optical fiber and reflected by said surface will be picked up by said optical fiber associated with said photosensitive device to be transmitted to said photosensitive device.

References Cited

UNITED STATES PATENTS

| | | | |
|---|---|---|---|
| 2,420,716 | 5/1947 | Morton et al. | 250—227 |
| 2,541,277 | 2/1951 | Omberg et al. | 33—1 |
| 3,140,911 | 7/1964 | Johnson | 346—31 |
| 3,182,291 | 5/1965 | Nassimbene | 250—227 |

RALPH G. NILSON, *Primary Examiner.*

J. D. WALL, *Assistant Examiner.*